June 28, 1966  F. KUGEL ETAL  3,258,081
POWER TRANSMISSION TO WHEELS AND POWER TAKE-OFF
Filed Sept. 21, 1960  2 Sheets-Sheet 1

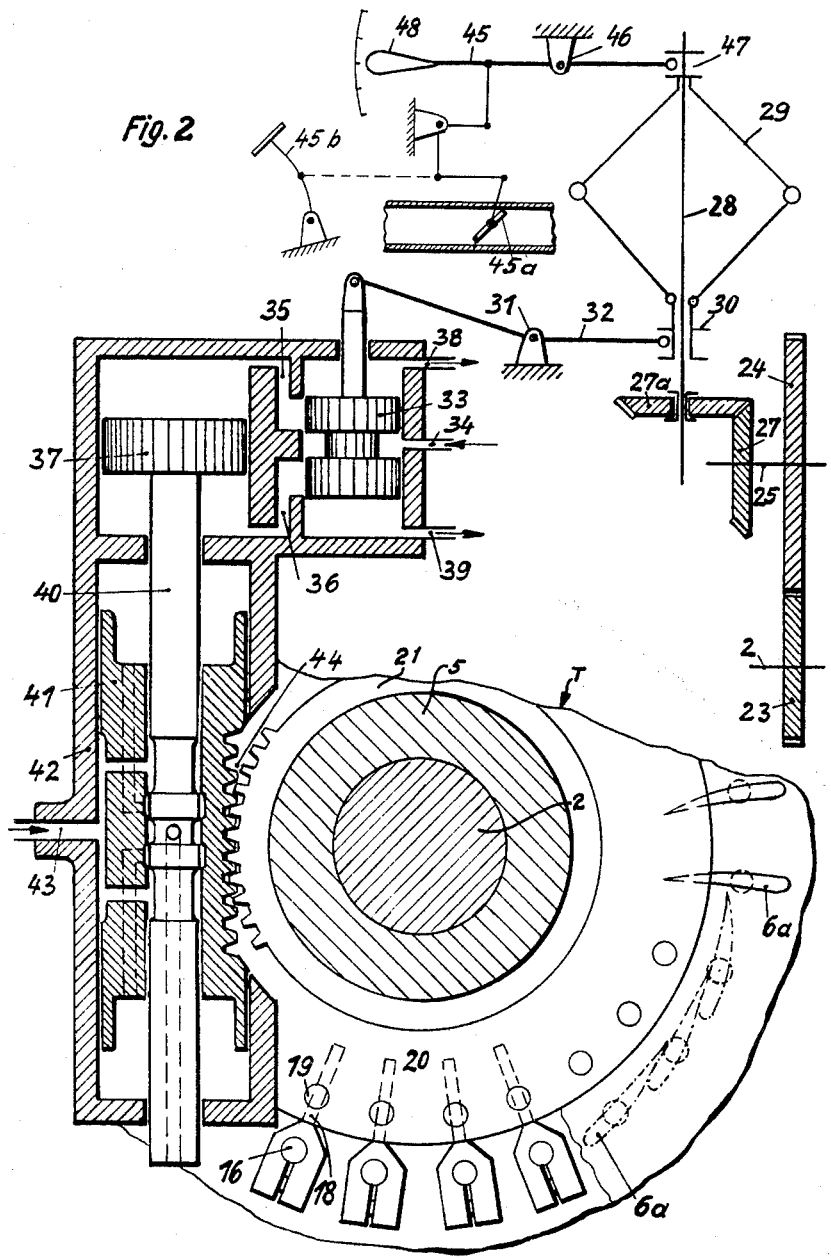

United States Patent Office 3,258,081
Patented June 28, 1966

3,258,081
POWER TRANSMISSION TO WHEELS AND POWER TAKE-OFF
Fritz Kugel, Heidenheim (Brenz), Germany, and Serge Jean Marie Gewitsch-Gachet, Paris, France, assignors to J. M. Voith G.m.b.H., Heidenheim (Brenz), Germany
Filed Sept. 21, 1960, Ser. No. 57,503
Claims priority, application Germany, Sept. 26, 1959, V 17,317
12 Claims. (Cl. 180—53)

With motor vehicles there frequently exists the problem to move a vehicle by means of an internal combustion engine and at the same time not directly from the vehicle axle to drive a machine mounted on the vehicle or a trailer as may for instance be the case with an agricultural tractor in connection with a mowing and binding machine, with street cleaning vehicles or with vehicles for actuating a snow removing device.

The most simple solution of this problem consists in driving the vehicle by means of a gear transmission and clutches or couplings, and to derive the drive for the additional machine through the intervention of a fixed gear transmission from the motor.

The disadvantage of such installations consists in that the additional machine requires a certain portion of the motor output which may be from the very start adjusted by appropriately selecting the fixed gear transmission ratios, but once the selection has been made, it cannot be changed any more during the entire working operation. On the other hand, it may occur that the additional machine drive suddenly requires a considerably greater power than before. This greater power will then, however, not be available when vehicle and additional machine power together total approximately the maximum motor output in order to assure full exploitation of the motor output. Consequently, in such an instance, when employing internal combustion engines, the result will be a drop in the motor speed and thereby a drop in the motor output. This may go so far that the motor will be choked to a stop. Similarly, such choking of the motor may occur when suddenly a greater power will be taken from the vehicle drive as may be the case for instance when the vehicle has to climb.

It is, therefore, an object of the present invention to provide a power transmission for driving a vehicle and in addition thereto a working or additional machine, which will overcome the above mentioned drawbacks.

It is another object of the invention to provide a power transmission as set forth in the preceding paragraph, which will make it possible that the driving motor will also under varying load of the vehicle and of the additional machine operate with optimum motor output.

These and other objects and advantages of the invention will appear more clearly from the following specification in connection with the accompanying drawings, in which:

FIG. 2 shows a control arrangement for the torque converter of the arrangement of FIG. 1.

*General arrangement*

Figure 1:
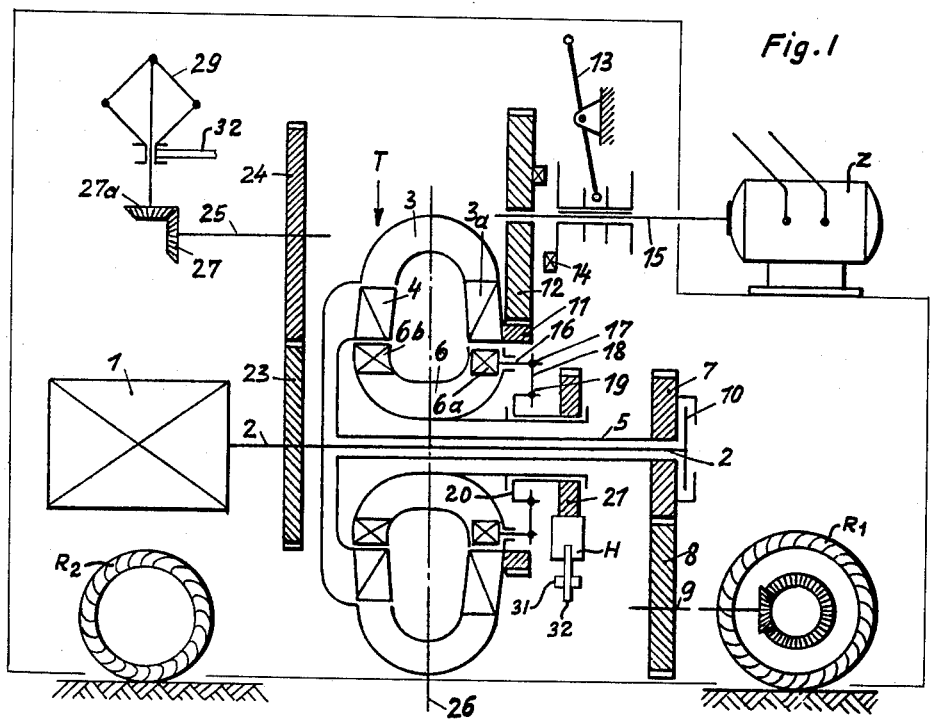
FIG. 1 is a diagrammatic longitudinal section through a power transmission system according to the present invention.

The objects outlined above have been realized according to the present invention by the combination of the following features:

(a) In the driving path of the vehicle there is arranged in a manner known per se a torque converter, preferably a fluid converter.

(b) The driving path for the working machine or the additional machine branches off in a manner known per se from the driving path of the vehicle ahead of the torque converter, and (c) In conformity with the present invention, there is provided a device including variable drive means for controlling the power absorption of the converter which control will make it possible so to control the converter by means known per se that at a certain fuel supply adjustment, a certain motor output and thereby the motor speed corresponding to same will be held at least approximately constant.

A power transmission designed in this way will make it possible that the motor will always furnish an optimum output corresponding approximately to the respective fuel supply. In other words, the motor will not have to operate within the range of a low output. Particularly when adjusting the motor for its maximum continuous output, a full exploitation of the motor will be assured. This is due to the fact that, particularly due to the automatically working control of the torque converter in conformity with the motor speed, it will be brought about that the total of the driving power for the vehicle and for the additional machine will yield the maximum continuous motor output. When, for instance, the additional machine does not absorb or use the predetermined maximum power, the driving power of the vehicle and thereby the driving speed will be increased until the full motor output will be used up. Inversely, the motor speed will decrease if, for instance, a snow removing machine has suddenly to remove a large snow collection so that a higher power than before will be required.

Depending on the construction of the converter, the motor will more or less indirectly feel a handicap or sudden incline in the path of the vehicle. If a load sensitive converter is employed, the motor speed will drop immediately with the result that an immediate control of the torque power absorption will be effected. In another instance when the torque converter does not convey the load shocks to the motor, first the vehicle speed only will decrease. Customarily this results in a decrease in the output of the additional machine because the required output of said machine is usually road dependent. At the same time, through the motor speed, the power absorption of the converter will be increased which in turn will benefit the vehicle power.

Thus, a full exploitation of the motor will be possible at all kinds of operation which may occur. The converter is advantageously so constructed that it can convey power practically up to full motor output.

A structurally particularly advantageous power transmission system according to the invention consists in that the drive path of the additional or working machine branches off from the primary part of the converter. To this end, the primary part of the converter is, for instance, provided with a gear ring meshing with a spur gear of the branch path.

When a fluid torque converter is employed as torque converter, the control possibility will be manifold by utilizing variable drive means. By changing the filling, by moving a sliding cylindrical valve or a guide blade ring in and out, by arranging tiltable primary, secondary or guide wheel blades, or by other known variable drive means, the power absorption of the torque converter may be varied.

A vehicle with a power transmission according to the invention must furthermore be able to drive from one working place for instance through a street to another working place, and frequently, while the working machine drive or drive for the additional machine is detached from the motor, at a speed which is higher than usual. In order to meet this requirement, the converter is so designed that its primary part and secondary part are adapted to be coupled to each other in a manner known per se. In this instance, the vehicle may be driven through purely mechanical velocity ranges.

In order to avoid the braking effect when the torque converter is bridged or shunted, means known per se may be employed. Thus, for instance, the converter may be emptied. This method, however, requires a certain time and a filling and emptying device. A further possibility of eliminating the braking effect consists in that the guide wheel is rotatably arranged and is held stationary for the normal operation either by a brake or by a free wheel drive, but is released for the shunting operation. Such an arrangement is relatively expensive, especially when the guide wheel blades are adjustable.

A particularly advantageous and simple way to reduce the braking losses of the shunted torque converter consists in making the blades of the guide wheel adjustable and in adjusting the same to closing position. The adjustable guide wheel blades will, at ordinary operation of the vehicle, make possible not only the control of the fluid torque converter in conformity with the present invention but will also, when in closing position, reduce the braking losses when the fluid torque converter is shunted. This is due to the fact that the flow in the converter circuit will, with the exception of the leaking losses at the guide wheel blades, be prevented which flow will occur to a certain extent due to the relative movement between stationary guide wheel and rotating primary and secondary part even though these parts are coupled together. These leakage losses occur because the closed guide wheel blades do not form an absolutely sealing ring, there still remains a certain braking effect.

In order also to reduce this remainder of the braking effect, according to a further feature of the present invention, a fluid torque converter with adjustable guide wheels is employed in which the primary part is arranged on that side which is remote from the drive motor while the secondary part is arranged on that side which faces the motor. The guide wheel is arranged radially within the bladed primary and secondary part. This torque converter is so designed that in order to make the torque converter control more responsive, the blade row located radially within the bladed primary and secondary parts and provided with adjustable guide wheel blades, is located substantially in the axial range of the primary wheel blading preferably in the direction of flow directly ahead of the primary wheel blading.

This arrangement is, of course, not limited merely to a power transmission with one branch-off power path. Experience has proved that an arrangement according to the present invention makes possible a particularly fine control of a torque converter which in addition to the reduction of the braking effect with shunted converter is desired with an installation according to the invention which, however, may be employed everywhere where the control of the torque conversion has to meet particularly high demands.

Furthermore, with such converters in which the adjustable guide blades are preceded by a further stationary guide wheel blade ring, it is advantageous to provide the stationary guide wheel blade ring at the exit of the secondary part and to extend said guide wheel blade ring substantially over the same radii as the adjustable guide wheel blades.

The above mentioned advantageous construction and the symmetric design of the torque converter bring about that in the rotating part of the converter, two equally large liquid rings form on the primary side as well as on the secondary side of the converter. These two liquid rings are pressed against each other in the mentioned plane by the centrifugal force but balance each other and therefore do not cause any flow. These liquid rings thus acting against each other reduce the slight flow which will be possible in view of the leakage losses at the adjustable closed guide wheel blades. If the primary and secondary part were not designed symmetrically with regard to each other, the differently large liquid rings would cause a flow and thereby a braking effect. Between the exit of the secondary wheel and the entrance of the guide wheel arranged behind said secondary wheel, an eddy current may develop in view of the relative speed between secondary wheel and guide wheel. Such eddy current might produce a certain braking effect which, however, will be extremely low.

*Structural arrangement*

Referring now to the drawings in detail, FIG. 1 shows a vehicle V comprising wheels R1 and R2 and a motor 1 which drives the primary wheel 3 with the blading 3a of a torque converter generally designated T through the intervention of a drive shaft 2. The output is effected through the secondary wheel 4 to an output shaft 5. The guide wheel 6 of the torque converter T is arranged stationary. The vehicle is driven through the output shaft through spur gears 7, 8 and a shaft 9 by the wheel R1. Primary wheel 3 and secondary wheel 4 may be bridged or shunted by coupling drive shaft 2 and output shaft 5 to each other by means of a friction clutch 10. The drive for the working machine or auxiliary machine Z is derived from primary wheel 3 which latter is provided with a gear ring 11 meshing with a pinion 12. By means of a jaw cluch 14 operable by a manually operable lever 13, the spur gear 12 may be connected to a shaft 15 connected to the working or auxiliary machine.

The guide wheel 6 is equipped with a double blading 6a, 6b. The guide blades of the right-hand guide blade row 6a form variable drive means, i.e. they are adjustable. More specifically, for this purpose the guide wheel blades 6a are provided with pins 16 which are journalled in the housing of the guide wheel. Connected to the free ends 17 of said pins 16 are levers 18 which are displaceable in transverse bores of bolts 19. The bolts 19 are rotatably mounted on a control ring 20. The control ring itself is rotatable about the torque converter axis. By rotating the control ring through spur gear 21 the blade position of the guide wheel blades 6a will be varied. The bladed primary and secondary parts are symmetrically designed with regard to plane 26 which is perpendicular to the axis of rotation of the converter. For purposes of driving a centrifugal governor 29 controlling the control device H, a spur gear 23 is mounted on motor shaft 2 and drives a spur gear 24 as well as a shaft 25.

The centrifugal governor and the control device are illustrated on a larger scale in FIG. 2. The centrifugal governor 29 is driven through shaft 25 and bevel gears 27, 27a. The displaceable shaft 28 of the centrifugal governor 29 has its lower end designed as a splined spindle on which the bevel gear 27a is mounted. Depending on the speed of the centrifugal governor, a sleeve 30 will be displaced axially. This movement is, by means of a double lever 32 journalled at 31, conveyed to a pre-control piston 33 of the controlling device H. At the adjusted motor speed, the piston 33 occupies the position shown in the drawing. When the speed changes, said piston 33 will be displaced. The oil enters through a conduit 34 and passes through one of the two passages 35, 36 to a piston 37 which will be moved either upwardly or downwardly. The displaced oil may escape through one of the openings 38, 39. The piston 37 serves by means of its control edges as a valve spool for a slidably arranged follower piston 41 guided in a housing 42. Each movement of piston 37 will, according to direction and magnitude, be conveyed by means of piston rod 40 to the follower piston 41. While the piston 37 and piston rod 40 may be moved by a slight force, the follower piston 41 produces a considerable force and thus will be in a position also to carry out controls which normally are difficult to effect. The pressure fluid for this servomotor piston system 40, 41 enters through a conduit 43.

The axial movement of the follower piston 41 will through teeth 44 turn the spur gear and the control ring 20 which latter, through the intervention of bolts 19, lever 18 and pins 16, will adjust the guide wheel blade 6a of the torque converter T (see also FIG. 1). FIG. 2 shows the guide wheel blades in dash lines in open as well as in closed position. When the guide wheel blades occupy their closed position, practically a sealing ring is formed through which no fluid circulation will be possible.

The control device according to the invention operates in such a manner that at a rated speed of the motor corresponding to a certain fuel supply to the motor, the pre-control piston 33 occupies such a position that the working piston 37 will not be displaced. This means that the oil from conduit 34 does not enter the cylinder of the piston 37 (see FIG. 2). Any motor speed different from the rated speed will bring about a displacement of piston 33 and thus an actuation of piston 37, follower piston 41 and an adjustment of the guide wheel blades. When the speed of the motor drops, for instance in view of a higher resistance encountered by the working or additional machine (higher power absorption), the pre-control piston 33 will by lever 32 be moved upwardly. The oil will then flow from conduit 34 through passage 35 into the space above piston 37 so that the latter will be pressed downwardly. The follower piston 41 will then carry out a corresponding movement. The control ring 20 will rotate in counterclockwise direction and move the guide wheel blades 6a into closing direction. As a result thereof, the power transmission of the torque converter and the speed of the vehicle will drop. Consequently, the motor speed will be able to increase again and the control operation stops. If on the other hand the motor speed increases in view of decreased power absorption of the working machine or auxiliary machine so that the motor speed increases beyond the rated speed, the guide wheel blades will by said control device be moved into a position in which the converter will absorb increased power. Consequently, the vehicle will increase its speed while the motor will again run at its rated speed.

In this way, it is not only possible to take full advantage of the maximum output of the motor, but the control device may, according to the desired motor speed, be so designed that other motor speeds, i.e. other power output values of the motor, will be held constant. FIG. 2 illustrates a double lever 45 tiltable about the pivot 46. This lever 45 is connected with the throttle-valve 45a of the engine and arrests the position of the centrifugal governor shaft 28 in vertical direction by having one end of said lever engaging a sleeve 47. By means of a handle 48 at the other end of the lever, the centrifugal governor shaft 28 may be moved vertically. The lower end of the centrifugal governor shaft 28 has a grooved profile and is slidably guided in the bevel gear 27a. In this way, it is possible at various motor speeds so to adjust the centrifugal governor that the pre-control piston 33 will, at correspondingly rated speeds, occupy a position at which no control of the guide wheel blades will be effected. The actuation of lever 45 may be effected by the accelerator 45b for the motor or in connection therewith.

Figure 3:
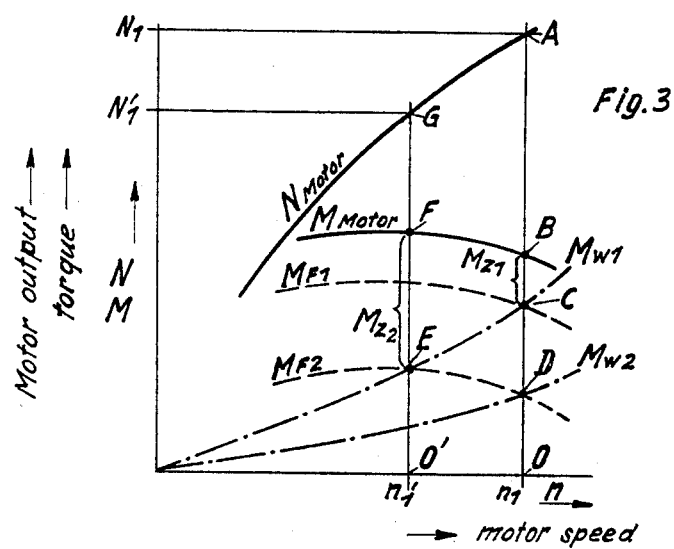
FIG. 3 represents a diagram illustrating the course of the outputs and torques plotted above the motor speed.

FIG. 3 illustrates the power and torque course plotted over the motor speed for a drive according to the invention. The curve $N_{motor}$ illustrates the course of the motor power, whereas the curve $M_{motor}$ indicates the course of the motor torque plotted over the motor speed $n$. The curbe $M_{W1}$ illustrates the absorbed torque converter moment over the primary speed at a certain guide wheel blade position while $M_{W2}$ shows the absorbed torque converter moment at less opened guide wheel blades. $M_{F1}$ and $M_{F2}$ indicate the torque requirement of the vehicle drive for instance at two different speeds. The difference in the values between $M_{F1}$, $M_{F2}$ and $M_{motor}$ is the torque $M_{Z1}$ and $M_{Z2}$ at the branch shaft for the working machine drive.

The torque distribution at the rated speed $n_1$ may first be considered. At this speed, the motor furnishes the rated power $N_1$ (point A). This power corresponds to a motor torque OB. It may be assumed that the vehicle will at $n_1$ absorb a torque OC. Thus, there will remain a torque $BC=M_{Z1}$ for the working machine.

It may now be assumed that suddenly the torque of the working machine drive increases to $M_{Z2}$. As a result thereof, the speed of the motor will first drop somewhat and the control operation will start. After effected control, i.e. at the motor speed $n_1$, the vehicle will have available only a torque OD, namely $OB-M_{Z2}=OD$. The vehicle speed will therefore have dropped. The working machine on the other hand operates at an increased torque corresponding to $OB-OD=M_{Z2}$. The converter will therefore work according to the curve $M_{W2}$. The motor will nevertheless retain the rated speed $n_1$ which means it will further work within the range of the rated power.

If the converter were not adjustable, it will be obvious that with an increase in the working machine torque from $M_{Z1}$ to $M_{Z2}$, the motor speed $n_1$ would drop in conformity with the curve $M_{W1}$. Only at $n'_1$ the total of vehicle torque and working machine torque will again equal the motor torque $O'F$. The primary torque of the converter drops from OC to O'E. To the motor speed $n'_1$ will at point G correspond a power $N'_1$ which is less than $N_1$. Thus, with a converter which is not controllable, the motor would frequently also have to operate within a range of reduced power output.

It is, of course, to be understood that the present invention is, by no means, limited to the particular construction shown in the drawings but also comprises any modifications within the scope of the appended claims.

What we claim is:

1. In a power transmission plant comprising an internal combustion engine having a crankshaft and mounted on a vehicle having at least one wheel to be driven by said engine, and a machine having variable power requirements also to be driven by said engine: a fluid flow converter having a bladed primary part connected to said crankshaft and a bladed secondary part connected to said wheel and a stationary guide wheel with adjustable guide wheel blades and with non-adjustable guide wheel blades, said non-adjustable guide wheel blades being arranged at the exit of said secondary part and extending substantially over the same radii as said adjustable guide wheel blades, said primary part being arranged on that side of said converter which is remote from said engine, and said secondary part being arranged on that side of said converter which is adjacent said engine while said guide wheel is arranged radially within said bladed primary and secondary parts, adjusting means associated with said converter for adjusting said adjustable blades for varying the power absorption thereof, said primary and said secondary parts being arranged substantially symmetrically with regard to a plane substantially vertical to the axis of rotation of said converter, and said adjustable guide wheel blades being located substantially within the axial range of the blades of the primary part, a drive connection from the engine to said machine on the primary side of said converter, and control means operatively connected to said engine and to said adjusting means and operable at a certain adjustment of the supply of fuel to said engine to maintain a certain engine output and thereby the engine speed corresponding thereto at least approximately constant, said converter being provided with coupling means interposed between said primary part and said secondary part and operable selectively to couple the same together, and said adjusting means being operative for turning said blades from a certain open position to a closing position to thereby control the secondary torque and to reduce braking losses occurring when said coupling means couples said primary and said secondary parts together.

2. An arrangement according to claim 1, in which the adjustable guide wheel blades are located directly ahead of the blades of the primary part when looking in the direction of flow.

3. In a power transmission plant comprising an internal combustion engine having a crankshaft and mounted on a vehicle having at least one wheel to be driven by said engine, and a machine having variable power requirements also to be driven by said engine: a fluid flow converter having a bladed primary part connected to said crankshaft and a bladed secondary part connected to said wheel and having a stationary guide wheel with adjustable guide wheel blades and with non-adjustable guide wheel blades, said non-adjustable guide wheel blades being arranged at the exit of said secondary part and extending substantially over the same radii as said adjustable guide wheel blades and said adjustable guide wheel blades being located directly ahead of the blades of the primary part when looking in the direction of flow, said converter being provided with coupling means interposed between said primary part and said secondary part and operable selectively to couple the same together, said primary part being arranged on that side of said converter which is remote from said engine, and said secondary part being arranged on that side of said converter which is adjacent said engine while said guide wheel is arranged radially within said bladed primary and secondary parts, said converter being provided with adjusting means for adjusting said adjustable blades for varying the power absorption of said converter, said adjustable guide wheel blades being located substantially within the axial range of the blades of the primary part, a drive connection from the engine to said machine on the primary side of said converter, and control means operatively connected to said engine and said adjusting means and operable at a certain adjustment of the supply of fuel to said engine to maintain a certain engine output and thereby the engine speed corresponding thereto at least approximately constant, and said adjusting means being operative for turning said blades from a certain open position to a closing position to thereby control the secondary torque and to reduce braking losses occurring when said coupling means couples said primary and said secondary parts together.

4. In a power transmission plant; a torque convertor having a bladed primary wheel arranged to be driven by a variable speed source of power and also have a bladed secondary wheel adapted for driving connection to a load, said wheels being rotatable, said convertor also including a stationary bladed guide wheel, at least one set of adjustable blades on said guide wheel adjustable in closing direction to decrease the power absorption of the convertor and adjustable in opening direction to increase the power absorption of the convertor, a governor drivingly connected to said primary wheel, control means connecting said governor with said set of adjustable guide blades and operable to cause said guide blades to move in closing direction in response to a reduction in the speed of said primary wheel and to move in opening direction in response to an increase in the speed of said primary wheel, and a power take-off for an auxiliary device branching off from said primary wheel, the load on said auxiliary device being variable, and said control means being operable to maintain substantially constant load on said primary wheel at any given power input thereto thereby to hold the speed of said primary wheel substantially constant at the said given power input.

5. A power transmission plant according to claim 4 in which said primary and secondary wheels are arranged symmetrically with relation to a plane passing transversely through the center of the convertor, said guide wheel being located radially inwardly of the primary and secondary wheels, means for clutching said primary and secondary wheels together for rotation as a unit, said adjustable guide blades being adjustable into completely open position when said primary and secondary wheels are clutched together to inhibit circulation of fluid in the converter.

6. In a power transmission plant comprising an internal combustion engine with a crankshaft and mounted on a vehicle having at least one wheel to be driven by said engine; a torque converter having a primary and a secondary shaft, said converter including variable drive means interposed between said primary and secondary shafts and forming a driving connection therebetween, said primary shaft being connected to said crankshaft, said secondary shaft being connected to said wheel, an independent machine requiring a variable power input at constant speed, a driving connection to said machine from between the crankshaft of said power transmission plant and said primary shaft of said converter, said variable drive means of said converter comprising control means adjustable for varying the amount of power delivered via said variable drive means from said primary shaft to said secondary shaft during constant speed rotation of said primary shaft, and means operable for adjusting said control means to maintain a certain engine output and thereby the engine speed corresponding thereto at least approximately constant during changes in the amount of power required by said machine.

7. An arrangement according to claim 6 which said engine includes speed adjusting means and said control means is connected to said speed adjusting means and wherein said connection of said speed adjusting means to said control means includes means responsive to the speed of said engine for automatically actuating said control means.

8. In a power transmission plant comprising an internal combustion engine with a crankshaft and mounted on a vehicle having at least one wheel to be driven by said engine; a torque converter having a primary and a secondary shaft, said converter including variable drive means interposed between said primary and secondary shafts and forming a driving connection therebetween, said primary shaft being connected to said crankshaft, said secondary shaft being connected to said wheel, an independent machine requiring a variable power input at constant speed, a driving connection to said machine from between the crankshaft of said power transmission plant and said primary shaft of said converter, said variable drive means of said converter comprising control means adjustable for varying the amount of power delivered via said variable drive means from said primary shaft to said secondary shaft during constant speed rotation of said primary shaft, means operable for adjusting said control means to maintain a certain engine output and thereby the engine speed corresponding thereto at least approximately constant during changes in the amount of power required by said machine, and coupling means interposed between said primary shaft and said secondary shaft and operable selectively to couple the same directly together for rotation as a unit.

9. A power transmission plant according to claim 8 wherein said converter is a fluid converter and said control means includes a stationary guide wheel having adjustable guide blades in the converter, and means operatively connected to the adjustable blades of said guide wheel for turning said blades from a certain open position to a closing position to thereby control the secondary torque and to reduce braking losses occurring when said coupling means couples said primary and said secondary shafts together.

10. In a power transmission plant comprising an internal combustion engine having a crankshaft and mounted on a vehicle having at least one wheel to be driven by said engine, and an independent machine arranged for driving connection with said engine: a fluid flow converter having a bladed primary part connected to said crankshaft and a bladed secondary part connected to said wheel and having a stationary guide wheel with adjustable guide blades, a fluid medium in the converter forming a driving connection between said primary and secondary parts, said primary part being arranged on that side of said converter which is remote from said engine, and said secondary part being arranged on that side of said converter which is adjacent said engine while said guide wheel is arranged radially within said bladed primary and secondary parts, said converter being provided with adjusting means for adjusting said guide blades for varying the power absorption of said converter, said adjustable guide blades being located substanially within the axial range of the blades of the primary part, a driving connection from the engine crankshaft to said machine, and control means operatively connected to said engine and to said adjusting means and operable at a certain adjustment of the supply of fuel to said engine to effect adjustment of said guide blades to maintain a certain engine output and thereby the engine speed corresponding thereto at least approximately constant.

11. An arrangement according to claim 10, in which the guide wheel is additionally provided with non-adjustable guide wheel blades arranged at the exit of said secondary part and extending substantially over the same radii as said adjustable guide wheel blades.

12. In a power transmission plant comprising an internal combustion engine having a crankshaft and mounted on a vehicle having at least one wheel to be driven by said engine, and an independent machine arranged for driving connection with said engine: a fluid flow converter having a bladed primary part connected to said crankshaft to be driven thereby and a bladed secondary part connected to said wheel to drive the wheel, said converter having a stationary guide wheel with adjustable guide blades, a fluid medium in the converter forming a driving connection between said primary and secondary parts, said primary part being arranged on that side of said converter which is remote from said engine, and said secondary part being arranged on that side of said converter which is adjacent said engine while said guide wheel is arranged radially within said bladed primary and secondary parts, said primary and said secondary parts being arranged substantially symmetrically with regard to a plane substantially vertical to the axis of rotation of said converter, adjusting means connected to said adjustable guide blades for adjusting said guide blades, and control means operatively connected to said engine and said adjusting means and operable at a certain adjustment of the supply of fuel to said engine to maintain a certain engine output and thereby the engine speed corresponding thereto at least approximately constant, said converter being provided with coupling means interposed between said primary part and said secondary part and operable selectively to couple the same directly together, and said control means being operative through said adjusting means for turning said blades from a certain open position to a closing position to thereby control the secondary torque and to reduce braking losses occurring when said coupling means couples said primary and said secondary parts together.

References Cited by the Examiner
UNITED STATES PATENTS

| | | |
|---|---|---|
| 2,292,482 | 8/1942 | Roche. |
| 2,467,077 | 4/1949 | Brunken _____ 180—53 X |
| 2,632,539 | 3/1953 | Black _____ 192—3.2 |
| 2,855,803 | 10/1958 | Knowles _____ 74—677 |
| 2,969,131 | 1/1961 | Black et al. _____ 192—3.2 |
| 2,999,400 | 9/1961 | Kelley. |

FOREIGN PATENTS 1,055,377  4/1959  Germany.

A. HARRY LEVY, *Primary Examiner.*

PHILIP ARNOLD, *Examiner.*